(12) United States Patent
Matsumi et al.

(10) Patent No.: US 6,960,716 B2
(45) Date of Patent: Nov. 1, 2005

(54) SOLAR CELL MODULE, METHOD OF CONNECTING SOLAR CELL MODULE, METHOD OF INSTALLING SOLAR CELL MODULE AND METHOD OF GROUNDING SOLAR CELL MODULE

(75) Inventors: Shin Matsumi, Suita (JP); Toshio Yagiura, Kadoma (JP)

(73) Assignee: Sanyo Electric Co., Ltd., Osaka (JP)

( * ) Notice: Subject to any disclaimer, the term of this patent is extended or adjusted under 35 U.S.C. 154(b) by 104 days.

(21) Appl. No.: 09/875,742

(22) Filed: Jun. 6, 2001

(65) Prior Publication Data

US 2001/0050102 A1 Dec. 13, 2001

(30) Foreign Application Priority Data

Jun. 7, 2000 (JP) .......................................... 2000-170194
Aug. 25, 2000 (JP) .......................................... 2000-256235
Nov. 17, 2000 (JP) .......................................... 2000-351873

(51) Int. Cl.⁷ .................. H01L 31/05; H01L 21/00; H02N 6/00
(52) U.S. Cl. .................. 136/244; 136/251; 136/291
(58) Field of Search .................. 439/418, 425, 439/426; 136/244, 251, 252, 259, 291; 52/173.3

(56) References Cited

U.S. PATENT DOCUMENTS

| | | | | |
|---|---|---|---|---|
| 4,321,416 A | * | 3/1982 | Tennant | 136/244 |
| 4,679,881 A | * | 7/1987 | Galvin et al. | 439/392 |
| 5,143,556 A | * | 9/1992 | Matlin | 136/244 |
| 5,378,171 A | * | 1/1995 | Czerlanis | 439/425 |
| 5,590,495 A | * | 1/1997 | Bressler et al. | 52/173.3 |
| 6,037,679 A | * | 3/2000 | Pirillo | 307/125 |
| 6,245,987 B1 | * | 6/2001 | Shiomi et al. | 136/244 |
| 6,269,596 B1 | * | 8/2001 | Ohtsuka et al. | 52/173.3 |

FOREIGN PATENT DOCUMENTS

| | | |
|---|---|---|
| EP | 0283013 | 2/1990 |
| JP | 63-231885 | 9/1988 |
| JP | 11-299126 | 10/1999 |

* cited by examiner

Primary Examiner—Nam Nguyen
Assistant Examiner—Brian L Mutschler
(74) Attorney, Agent, or Firm—Darby & Darby

(57) ABSTRACT

A solar cell module includes a connecting member to be passed through a coating of a cable for electrically connecting a plurality of solar cell modules and to be electrically connected to a core wire of the cable. The solar cell module is connected to the cable by pressing the connecting member of the solar cell module to pass through the coating of the cable and come into contact with the core wire of the cable. An electrical connection of the solar cell module with a ground wire is made by a similar technique.

12 Claims, 19 Drawing Sheets

FIG. 19A
FIG. 19B
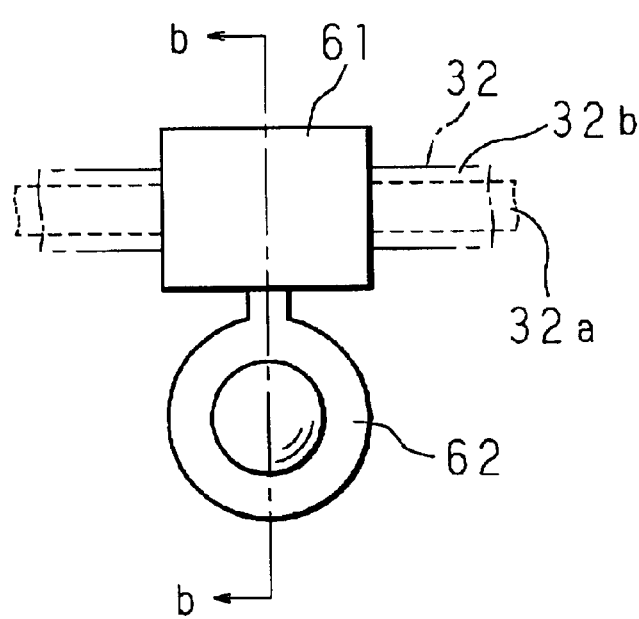
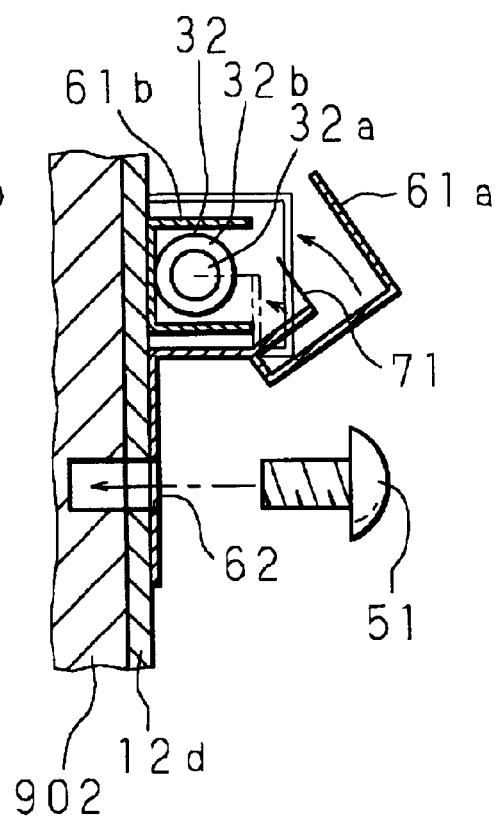

SOLAR CELL MODULE, METHOD OF CONNECTING SOLAR CELL MODULE, METHOD OF INSTALLING SOLAR CELL MODULE AND METHOD OF GROUNDING SOLAR CELL MODULE

BACKGROUND OF THE INVENTION

The present invention relates to a solar cell module to be connected to a cable for connecting the solar cell modules to each other, a method of connecting the solar cell module, a method of installing a plurality of solar cell modules on an installing body such as the roof of a house without using a rack, a solar cell module to be connected to a ground wire for making a ground connection, and a method of grounding the solar cell module.

Photovoltaic power generation for converting light energy into electrical energy by using a photoelectric conversion effect has been widely used as means for obtaining clean energy. Besides, with an improvement of the photoelectric conversion efficiency of solar cells, the number of private houses using a photovoltaic power generation system has been increasing.

In such a photovoltaic power generation system, a plurality of solar cell modules, each comprising a solar cell portion where a plurality of stages of solar cells are connected in series, are connected to a trunk cable, and a DC output of the solar cell modules collected through the trunk cable is converted into an AC output by an inverter and the AC output is outputted.

There is a known method of connecting solar cell modules, which facilitates wiring in connecting a plurality of solar cell modules to a trunk cable (for example, Japanese Patent Application Laid-Open No. 11-299126/1999). According to this conventional connecting method, the solar cell module can be easily connected to the trunk cable by connecting a male connector or a female connector provided on the trunk cable to a female or male connector provided on the solar cell module.

In the above-mentioned conventional method of connecting solar cell modules, there is a problem that the male and female connectors become expensive in order to improve their waterproof performance, and there is also a room for improvement of the waterproof performance at the connected section.

Moreover, in a photovoltaic power generation system for private houses, a technique of installing a plurality of solar cell modules directly on a building material of a roof (sheathing roof board) without using a rack has been employed in addition to a technique of installing a plurality of solar cell modules on a metal rack.

In order to make the appearance of the solar cell modules similar to the roof, the method of installing a plurality of solar cell modules on the sheathing roof board often employs a so-called stepped-roofing structure in which a plurality of solar cell modules are installed stepwise from the ridge side toward the eave side in such a manner that the ends of adjacent solar cell modules overlap each other. In this case, since the waterproof property is obtained by engagement of adjacent solar cell modules, it is difficult to replace the solar cell modules on a piece by piece basis, and thus there is a problem that this method can not respond efficiently to a breakdown or installation defect of the solar cell modules. Furthermore, there are problems that the installation involves complicated work processes and it takes a long time to perform the processes.

In the case where a plurality of solar cell modules are installed on a metal rack, since a metal frame portion on the periphery of the solar cell module is fixed to the rack, the periphery of each solar cell module and the rack have an equal electric potential, and therefore each solar cell module can be grounded if the rack itself is connected to a ground wire. On the other hand, when a plurality of solar cell modules are installed directly on the building material of the roof (sheathing room board), since the rack is not provided, it is necessary to additionally provide a wire for connecting each solar cell module to the ground wire on the periphery of each solar cell module so as to ground the solar cell modules, and there is a demand for simplicity of connection with the ground wire.

BRIEF SUMMARY OF THE INVENTION

An object of the present invention is to provide a solar cell module capable of being easily connected to a cable for connecting solar cell modules to each other, at a low cost, and of ensuring a high waterproof property at the connected section, and to provide a connecting method thereof.

Another object of the present invention is to provide a method of installing solar cell modules, which enables the solar cell modules to be readily replaced on a piece by piece basis and a plurality of solar cell modules to be installed in a short time.

Still another object of the present invention is to provide a solar cell module capable of being easily connected to a ground wire at a low cost, and a grounding method thereof.

The first aspect of the present invention is a solar cell module which is to be connected to a cable constructed by sealing a core wire with a coating and comprises a connecting member to be passed through the coating of the cable and electrically connected to the core wire of the cable. The solar cell module of this first aspect comprises the connecting member to be passed through the coating of the cable and electrically connected to the core wire, makes an electrical connection easily, and requires no connector which is used in prior arts, thereby reducing the cost. Moreover, since the connecting member is buried in the coating of the cable, the connected section ensures a high waterproof property.

The solar cell module of the first aspect comprises a supporting body for supporting a solar cell portion, and the connecting member is supported on the supporting body. Since the connecting member is provided on the supporting body for supporting the solar cell portion, this solar cell module is easily carried, thereby improving the work efficiency.

The connecting member of the solar cell module of the first aspect is a pair of positive and negative connecting members to be electrically connected to a pair of positive and negative core wires of the cable. By electrically connecting the pair of positive and negative connecting members to the pair of positive and negative core wires of the cable, respectively, a plurality of solar cell modules are connected in parallel.

The second aspect of the present invention is a solar cell module which is to be connected to a cable constructed by sealing a core wire with a coating and comprises: a pair of positive and negative connecting members to be passed through the coating of the cable and electrically connected to the core wire of the cable; and a cutting member for cutting the core wire of the cable connected to the pair of positive and negative connecting members between the pair of positive and negative connecting members. According to the solar cell module of this second aspect, since the cutting member cuts the core wire of the cable between the pair of positive and negative connecting members electrically connected to the core wire of the cable, a plurality of solar cell modules are connected in series.

The third aspect of the present invention is a method of connecting the solar cell module of the first or second aspect to a cable, wherein the solar cell module is connected to the cable by pressing the connecting member of the solar cell module to pass through a coating of the cable and come into contact with a core wire of the cable. An electrical connection of the solar cell module with the cable is made by pressing the connecting member of the solar cell module to pass through the coating of the cable and come into contact with the core wire. Therefore, an electrical connection is easily made, and a low cost is realized because no connector which is used in prior arts is required. Furthermore, since the connecting member is buried in the coating of the cable, the connected section ensures a high waterproof property.

The fourth aspect of the present invention is a method of installing a plurality of solar cell modules to overlap each other on an installing body, wherein the solar cell modules are arranged so that a lower portion of the solar cell module on an upper side and an upper portion of the solar cell module on a lower side overlap each other, and each overlapped portion is fixed to the installing body by a screw fixation. The overlapped portion of the lower portion of the solar cell module on the upper side and the upper portion of the solar cell module on the lower side is fixed to the installing body with a screw. The lower-side solar cell module can be easily detached by loosening the screw, and it is therefore possible to readily replace the solar cell modules on a piece by piece basis. Besides, a large number of solar cell modules can be installed in a short time.

In the method of installing solar cell modules of the fourth aspect, an electrical connection of the lower-side solar cell module with a cable is made by the screw fixation. In the process of fixing the upper- and lower-side solar cell modules with a screw, the lower-side solar cell module is electrically connected to the cable. Therefore, the fixation process and the electrical connection process are achieved simultaneously, and the installation of the solar cell modules is performed efficiently. Moreover, the electrical connection is easily cut by simply loosening the screw.

The fifth aspect of the present invention is a solar cell module which is to be connected to a ground wire constructed by sealing a core wire with a coating and comprises a ground connecting member to be passed through the coating of the ground wire and electrically connected to the core wire of the ground wire. Since the solar cell module of this fifth aspect comprises the ground connecting member to be passed through the coating of the ground wire and electrically connected to the core wire, it is possible to make an electrical connection easily.

The solar cell module of the fifth aspect comprises a supporting body, made of a metal, for supporting a solar cell portion, and the ground connecting member is supported on the supporting body. Since the ground connecting member is provided on the supporting body for supporting the solar cell portion, this solar cell module is easily carried, thereby improving the work efficiency.

The sixth aspect of the present invention is a method of connecting the solar cell module of the fifth aspect to a ground wire, wherein the solar cell module is connected to the ground wire by pressing the ground connecting member of the solar cell module to pass through the coating of the ground wire and come into contact with the core wire of the ground wire. An electrical connection of the solar cell module (supporting body) with the ground wire is made by pressing the ground connecting member of the solar cell module to pass through the coating of the ground wire and come into contact with the core wire. It is therefore possible to readily grounding each solar cell module.

The seventh aspect of the present invention is a method of installing the solar cell module of the fifth aspect on an installing body, wherein connecting the ground connecting member to the supporting body is carried out by a screw fixation, and installation of the solar cell module on the installing body is achieved simultaneously with the screw fixation. The supporting body of the solar cell module and the ground connecting member are electrically connected by a screw fixation, and the solar cell module is installed/fixed on the installing body simultaneously with this screw fixation. Hence, there is no need to perform a special process for connecting the supporting body and the ground connecting member, and a ground connection is made efficiently.

The above and further objects and features of the invention will more fully be apparent from the following detailed description with accompanying drawings.

BRIEF DESCRIPTION OF THE SEVERAL VIEWS OF THE DRAWINGS

FIGS. 19A and 19B are schematic views of a ground connection part according to the fifth embodiment.

DESCRIPTION OF THE PREFERRED EMBODIMENTS

The following description will explain the present invention in detail with reference to drawings illustrating some embodiments thereof.

(First Embodiment)

Figure 1:
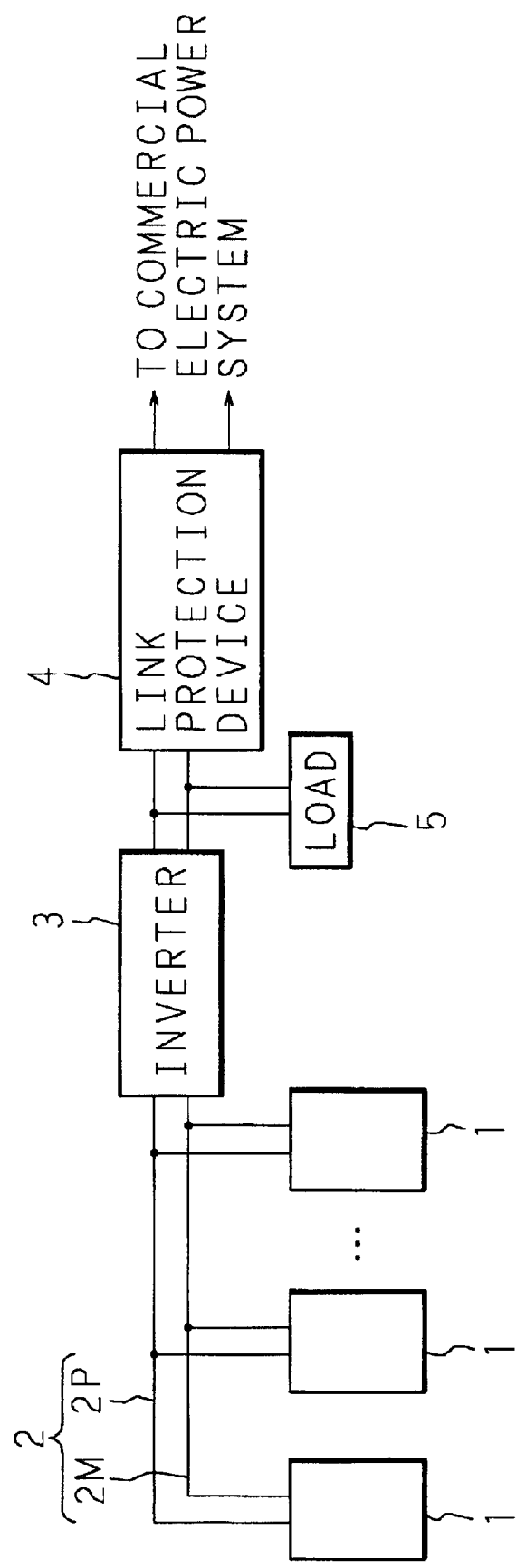
FIG. 1 is a schematic structural view of a photovoltaic power generation system.

FIG. 1 is a schematic structural view of an overall photovoltaic power generation system using solar cell modules of the present invention. In FIG. 1, numeral 1 is a solar cell module, and a plurality of solar cell modules 1 are connected in parallel to a connection cable 2 including a positive core wire 2P and a negative core wire 2M. As the connection cable 2, for example, two-conductor cable such as a two-conductor HCV cable may be used, or two one-conductor cables such as one-conductor HCV cables may be used. A DC output from a plurality of solar cell modules 1 is supplied to an inverter 3 through the connection cable 2 so as to be converted into an AC output, and then fed to a commercial electric power system through a load 5 or a link protection device 4.

Figure 2:
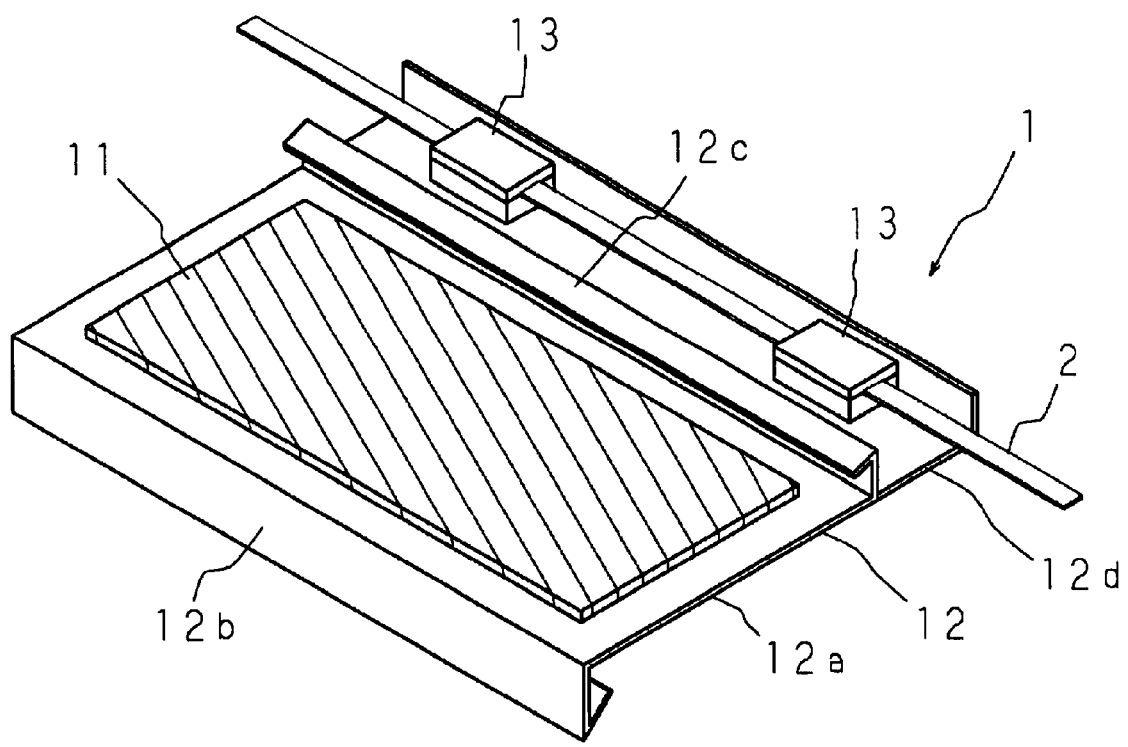
FIG. 2 is a perspective view of a solar cell module according to the first embodiment.

FIG. 2 is a perspective view showing the appearance of the solar cell module 1 according to the first embodiment. FIG. 2 also shows the connection cable 2 for reference. As shown in FIG. 2, the solar cell module 1 is constructed by bonding a solar cell portion 11 comprising solar cells made of a photoelectric converting material, such as crystalline silicon or amorphous silicon, onto a supporting body 12 made of a steel plate, for example. This supporting body 12 has a flat plate portion 12a onto which the solar cell portion 11 is bonded, a descended portion 12b and an ascended portion 12c provided on the eave side and ridge side, respectively, so that a plurality of solar cell modules 1 can be installed stepwise on the roof of a house or the like in such a manner that the descended portions 12b of the solar cell modules 1 on the ridge side engage with the ascended portions 12c of the solar cell modules 1 on the eave side.

Moreover, the supporting body 12 has an extended portion 12d which is further extended from the ascended portion 12c toward the ridge, and the ridge-side end of this extended portion 12d is bent upward. The extended portion 12d comprises a pair of positive and negative wire connection parts 13 for electrically connecting the solar cell module 1 to the connection cable 2, and these wire connection parts 13 are connected to the solar cell portion 11 by connecting wires, not shown.

Figure 3:
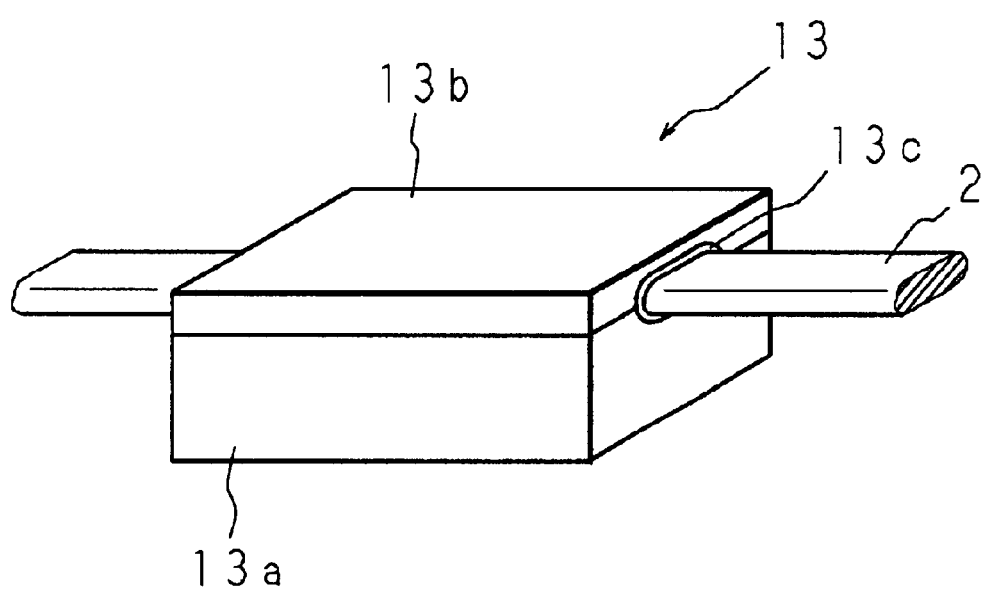
FIG. 3 is a perspective view of a wire connection part.

Next, referring to FIGS. 3 through 6, the following description will explain the structure of the wire connection part 13 in detail. FIG. 3 is a perspective view showing the appearance of the wire connection part 13, and also shows the connection cable 2 for reference. As shown in FIG. 3, the wire connection part 13 has a substantially rectangular parallelepiped shape, and is composed of a main body 13a and an upper lid 13b, each of which is made of an insulating plastic resin. Furthermore, an opening portion 13c for allowing insertion of the connection cable 2 is formed in the side faces.

Figure 4:
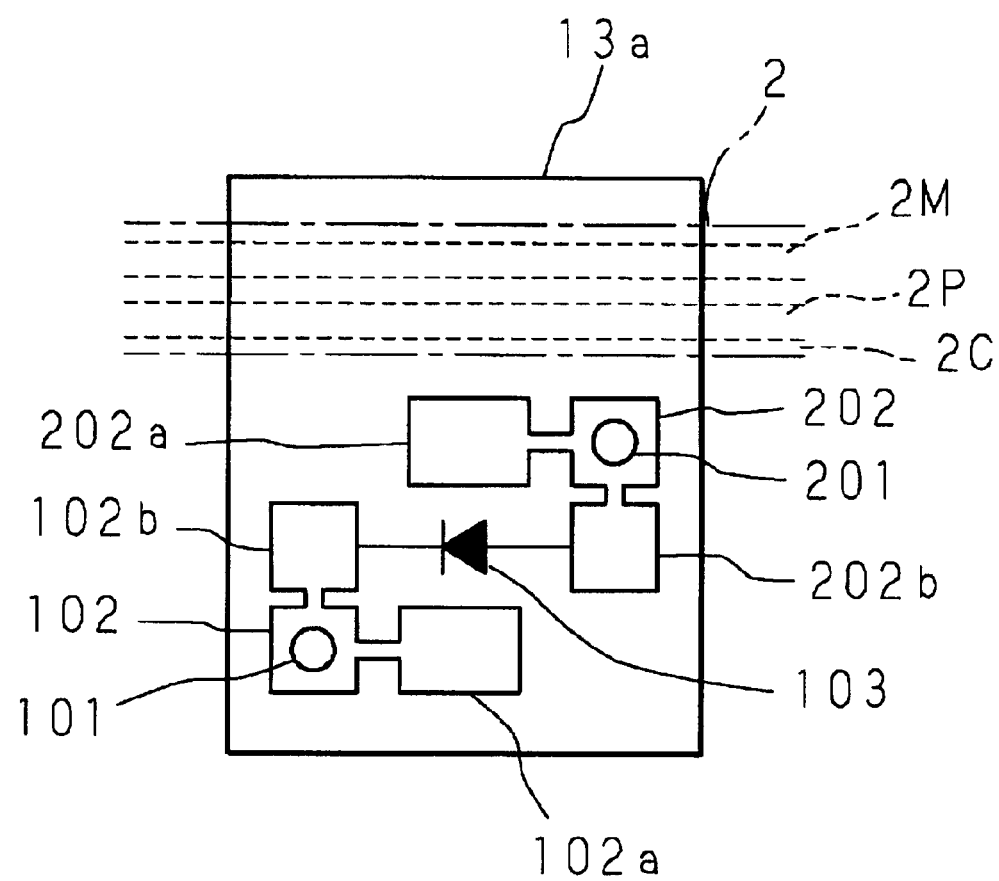
FIG. 4 is a plan view of the main body of the wire connection part.

FIG. 4 is a plan view of the main body 13a of the wire connection part 13 for the negative side, seen from an upper direction. In FIG. 4, for a reference purpose, the connection cable 2 using a two-conductor cable, for example, is shown by the alternate long and short dash lines, and this connection cable 2 is constructed by sealing the negative core wire 2M and positive core wire 2P indicated by the broken lines with a coating 2C. Note that, as mentioned above, it is also possible to use two one-conductor cables as the connection cable 2.

In FIG. 4, numerals 101 and 201 are both screws made of a metal, and screwed on a supporting body (not shown) which is made of a plastic resin and raised from the base of the main body 13a. Further, a first metal plate 102 having a first connection region 102a and a second connection region 102b and a second metal plate 202 having a third connection region 202a and a fourth connection region 202b are fixed with these screws 101 and 201, respectively. Hence, since the first metal plate 102 and the second metal plate 202 are screwed to the supporting body which is made of a plastic resin and raised from the base of the main body 13a, they have flexibility.

A back-flow preventing diode 103 is connected between the second connection region 102b of the first metal plate 102 and the fourth connection region 202b of the second metal plate 202. It is necessary to provide this back-flow preventing diode 103 only for the negative-side wire connection part 13, and there is no need to provide it for the positive-side wire connection part 13. In the positive-side wire connection part 13, the second connection region 102b and the fourth connection region 202b are connected simply by a metal plate.

Moreover, a negative connecting wire drawn from the solar cell portion 11 is connected to the first connection region 102a of the first metal plate 102, while the third connection region 202a of the second metal plate 202 is electrically connected to the negative core wire 2M of the connection cable 2 as to be described later.

Figure 5:
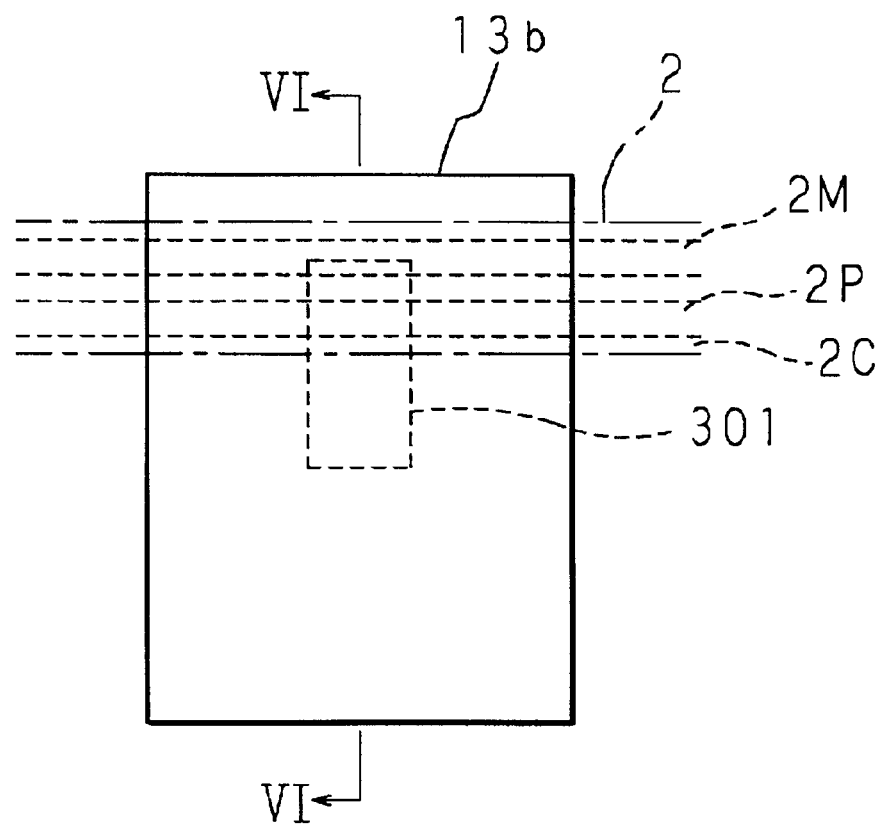
FIG. 5 is a plan view of the upper lid of the wire connection part.
Figure 6:
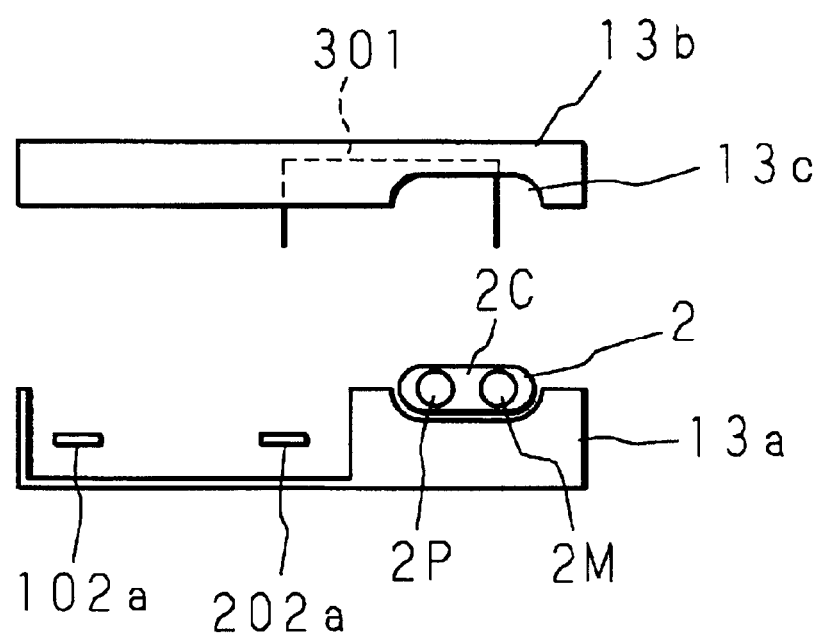
FIG. 6 is a cross section cut along the VI—VI line of FIG. 5.

FIG. 5 is a plan view of the upper lid 13b of the wire connection part 13 for the negative side, and FIG. 6 is a cross section cut along the VI—VI line of FIG. 5. In these FIGS. 5 and 6, the connection cable 2 is also shown for reference, and the cross section of the main body 13a is also shown for reference in FIG. 6.

In FIGS. 5 and 6, numeral 301 is a metallic connecting member having a substantially square bracket-shaped cross section, and most portion thereof is buried in the upper lid 13b as shown by the broken line. Further, the ends of the connecting member 301 protrude from the upper lid 13b toward the main body 13a at a position corresponding to the negative core wire 2M of the cable 2 and a position corresponding to the third connection region 202a of the second metal plate 202 provided on the main body 13a. Note that this structure relates to the negative-side wire connection part 13, and, in the positive-side wire connection section 13, an end of the connecting member 301 protrudes from the upper lid 13b at a position corresponding to the positive core wire 2P instead of a position corresponding to the negative core wire 2M.

Next, the following description will explain a method of connecting the solar module 1 and the connection cable 2 by using the wire connection parts 13 having a structure as described above.

First, the upper lids 13b of the positive- and negative-side wire connection parts 13 are removed, and the connection cable 2 is placed in the opening portions 13c. Next, by closing the upper lids 13b, one of the ends of each of the connecting members 301 protruding from the upper lids 13b comes into contact with the third connection region 202a of the second metal plate 202. At this time, the connection of the third connection region 202a and the connecting member 301 is maintained by the flexibility of the second metal plate 202. Besides, the other ends of the connecting members 301 protruding from the positive- and negative-side upper lids 13b pass through the coating 2C of the connection cable 2, pressed against the positive and negative core wires 2P and 2M and electrically connected to these core wires 2P and 2M, respectively.

As described above, according to the first embodiment, since the connecting member 301 is passed through the coating 2C of the connection cable 2 and electrically connected to the core wire 2P or 2M simultaneously with the action of closing the upper lid 13 of the wire connection part 13, the process of connecting the solar cell module 1 to the connection cable 2 is extremely easy. Moreover, unlike a conventional method, since no connector is used, it is possible to reduce the cost. Furthermore, since the connecting member 301 is buried in the coating 2C of the connection cable 2, the waterproof property is improved.

While the above example illustrates a case where the positive-side wire connection part 13 and the negative-side wire connection part 13 are provided separately, it is needless to say that it is possible to implement a structure using one wire connection part 13 comprising a pair of positive and negative connecting members 301.

(Second Embodiment)

Next, with reference to FIGS. 7 through 11, the following description will explain the second embodiment of the present invention. While the above-described first embodiment explains an example in which the solar cell modules 1 are connected to the connection cable 2 in parallel, this second embodiment is distinguished from the first embodiment by connecting a plurality of solar cell modules 1 in series.

Figure 7:
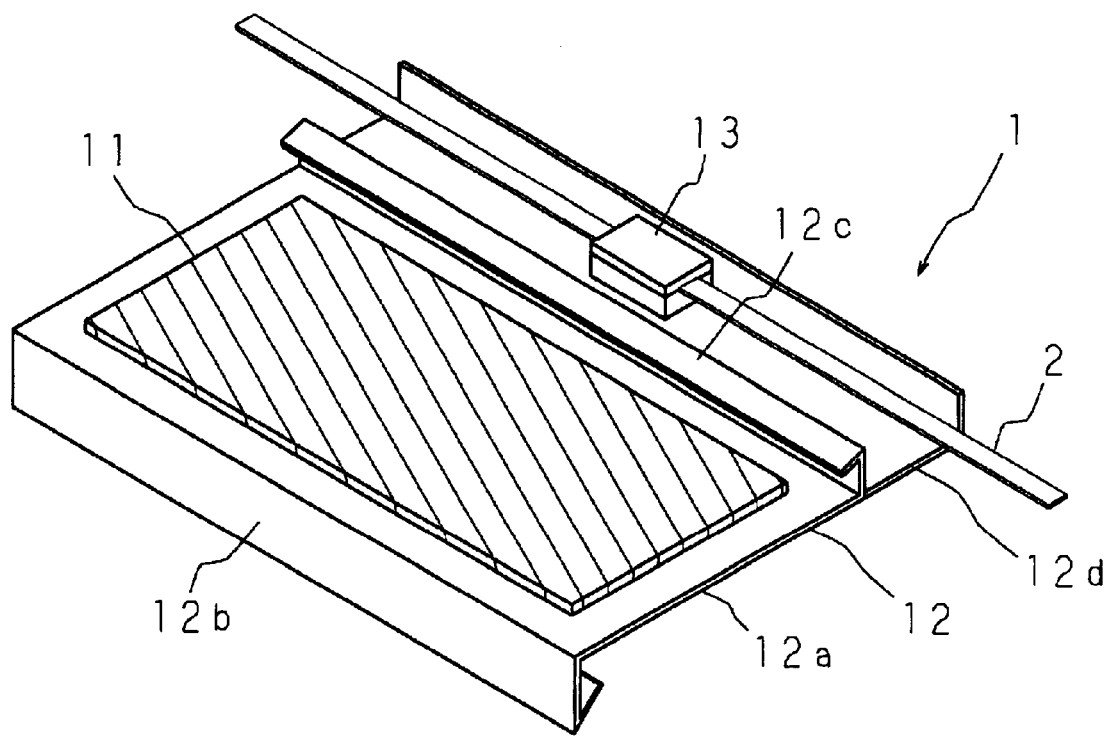
FIG. 7 is a perspective view of a solar cell module according to the second embodiment.

FIG. 7 is a perspective view showing the appearance of the solar cell module according to the second embodiment. The portions performing the same functions as those shown in FIG. 2 are designated with the same codes. As shown in FIG. 7, in the solar cell module 1 of this second embodiment, the solar cell portion 11 is bonded onto the supporting body 12, and the wire connection part 13 connected to the solar cell portion 11 with a connecting wire (not-shown) is provided on the extended portion 12d. This wire connection part 13 has the same appearance as in the first embodiment shown in FIG. 3 and has a substantially rectangular parallelepiped shape, and is composed of the main body 13a and the upper lid 13b, each of which is made of an insulating plastic resin. Furthermore, the opening portions 13c for allowing insertion of the connection cable 2 are formed in the side faces.

Figure 8:
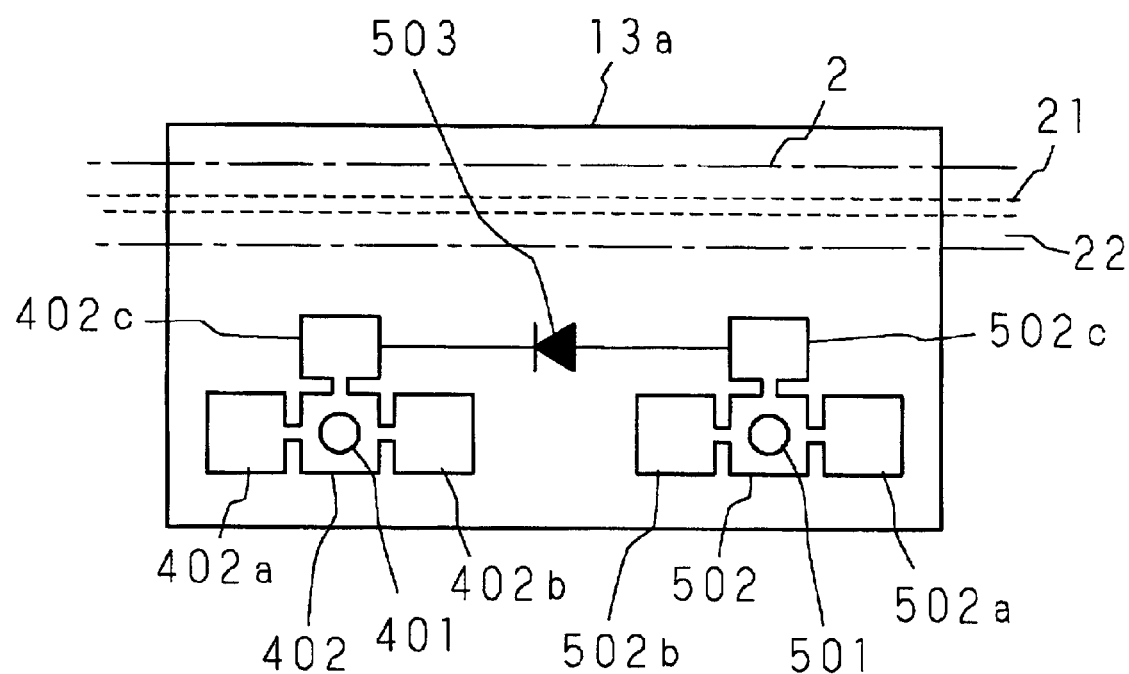
FIG. 8 is a plan view of the main body of a wire connection part.

Next, with reference to FIGS. 8 through 11, the following description will explain in detail the wire connection part 13 according to the second embodiment. FIG. 8 is a plan view of the main body 13a seen from an upper direction. For a reference purpose, the connection cable 2 is shown by the alternate long and short dash lines. In the second embodiment, a one-conductor cable is used as the connection cable 2, and this connection cable 2 is constructed by sealing a core wire 21 shown by the broken lines with a coating 22.

In FIG. 8, numerals 401 and 501 are both screws made of a metal, and screwed on a supporting body (not shown) which is made of a plastic resin and raised from the base of the main body 13a. Further, a first metal plate 402 having a first connection region 402a, a second connection region 402b and a third connection region 402c; and a second metal plate 502 having a fourth connection region 502a, a fifth connection region 502b and a sixth connection region 502c are fixed with these screws 401 and 501, respectively. Thus, since the first metal plate 402 and the second metal plate 502 are screwed to the supporting body raised from the base of the main body 13a, they have flexibility.

A positive connecting wire (not shown) from the solar cell portion 11 is connected to the second connection region 402b of the first metal plate 402, and a negative connecting wire (not shown) from the solar cell portion 11 is connected to the fifth connection region 502b of the second metal plate 502. Besides, a bypass diode 503 is connected between the third connection region 402c of the first metal plate 402 and the sixth connection region 502c of the second metal plate 502. Moreover, as to be described later, the core wire 21 of the connection cable 2 is connected to the first connection region 402a of the first metal plate 402 and the fourth connection region 502a of the second metal plate 502.

Figure 9:
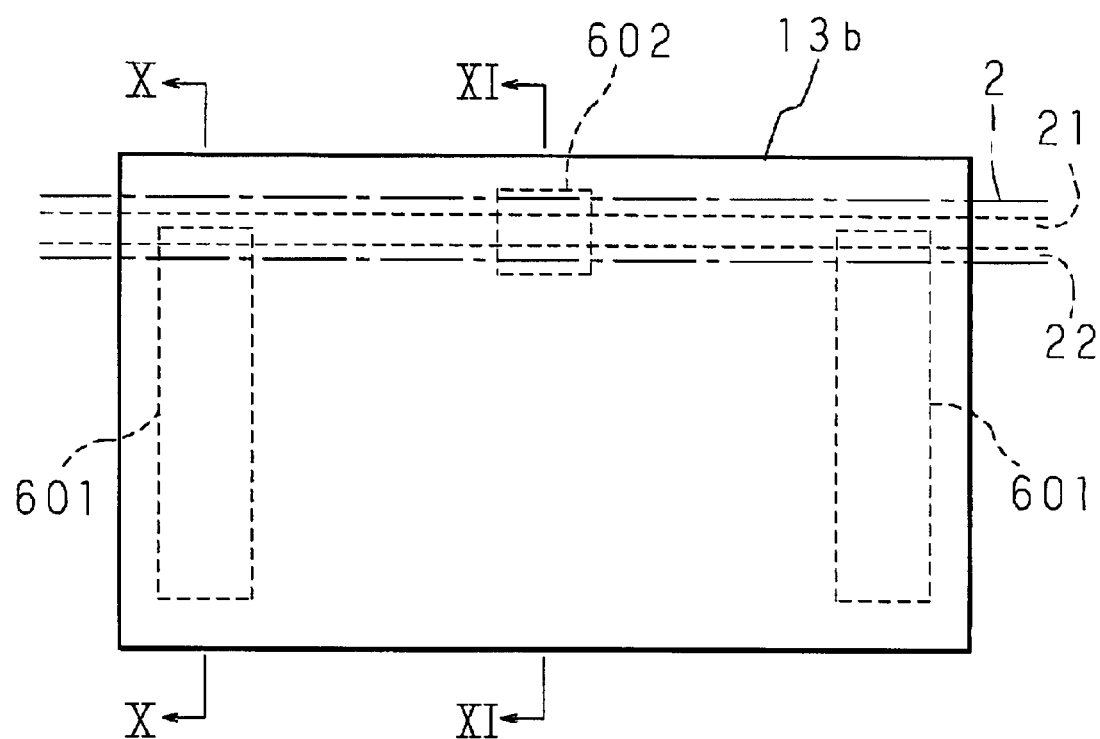
FIG. 9 is a plan view of the upper lid of the wire connection part.
Figure 10:
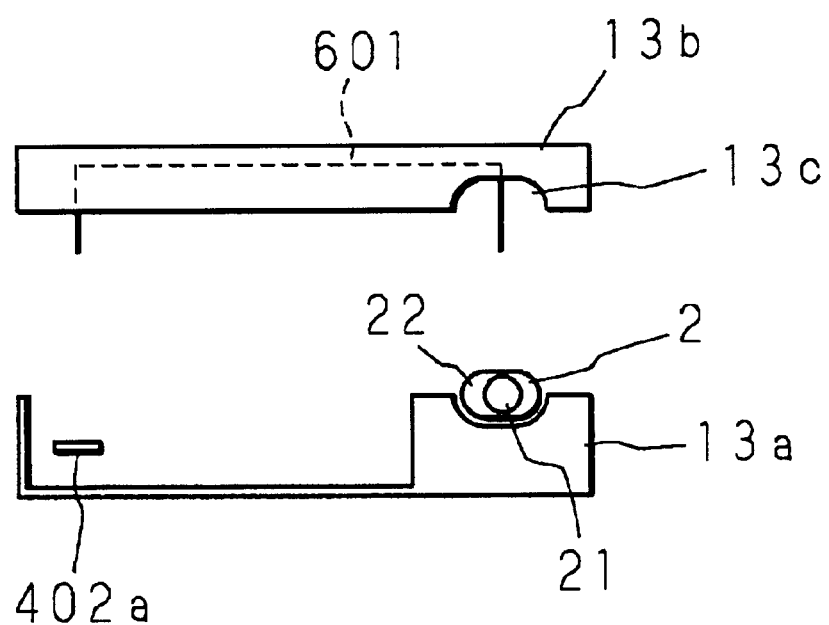
FIG. 10 is a cross section cut along the X—X line of FIG. 9.
Figure 11:
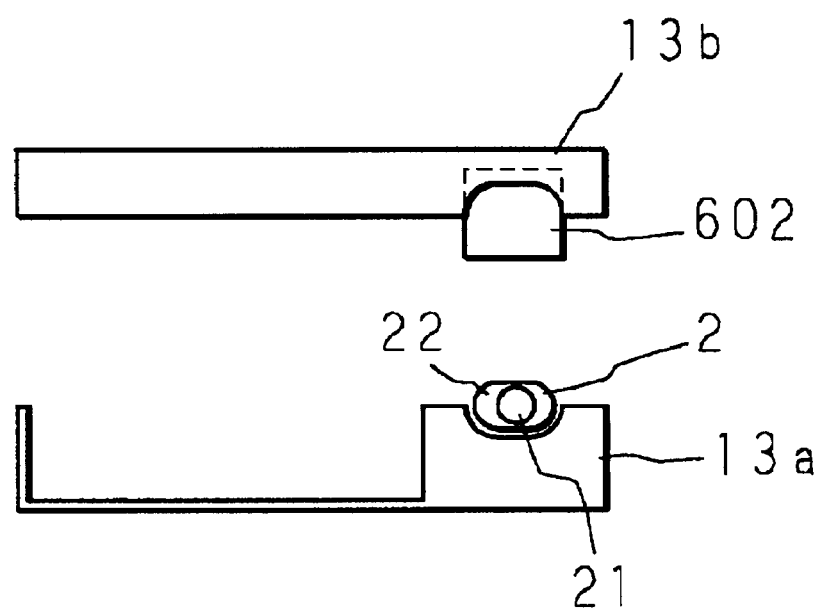
FIG. 11 is a cross section cut along the XI—XI line of FIG. 9.

FIG. 9 is a plan view of the upper lid 13b, FIG. 10 is a cross section cut along the X—X line of FIG. 9, and FIG. 11 is a cross section cut along the XI—XI line of FIG. 9. In these FIGS. 9 through 11, the connection cable 2 is also shown, and the cross section of the main body 13a is also shown in FIGS. 10 and 11.

In these drawings, numeral 601 represents connecting members which are made of a metal and electrically isolated from each other. Most portion of each connecting member 601 is buried in the upper lid 13b as shown by the broken line, and the ends of each connecting member 601 protrude from the upper lid 13b toward the main body 13a at a position corresponding to the core wire 21 of the connection cable 2 and a position corresponding to the first connection region 402a of the first metal plate 402, or a position corresponding to the fourth connection region 502a of the second metal plate 502.

Moreover, at a position between these connecting members 601 and corresponding to the connection cable 2, an insulating cutting member 602 for cutting this connection cable 2 is provided so as to protrude from the upper lid 13b. As this cutting member 602, for example, it is possible to use a ceramic cutter.

Next, the following description will explain a method of connecting the solar cell module 1 and the connection cable 2 according to the second embodiment.

First, the upper lid 13b of the wire connection part 13 is removed, and the connection cable 2 is placed in the opening portion 13c. Next, by closing the upper lid 13b, the ends of each of the connecting members 601 protruding from the upper lid 13b pass through the coating 22 of the connection cable 2 and come into contact with the core wire 21, and also come into contact with the first connection region 402a of the first metal plate 402 and the fourth connection region 502a of the second metal plate 502, respectively. At this time, the connections of the connecting members 601 with the first connection region 402a and the fourth connection region 502a are maintained by the flexibility of the first metal plate 402 and the second metal plate 502. Thus, the portion between the first connection region 402a and the fourth connection region 502a is electrically connected to the core wire 21 of the connection cable 2 through the connecting members 601.

Furthermore, by cutting the connection cable 2 with the cutting member 602 at a position between the connecting members 601, the solar cell module 1 is connected to the connection cable 2 in series. It is preferred to apply a butyl rubber or an insulating oil to the side faces of the cutting member 602 in advance so as to improve the waterproof property at the cut faces of the connection cable 2 after cutting.

As described above, according to the second embodiment, like the first embodiment, the process of electrically connecting the solar cell module 1 to the connection cable 2 is extremely easy, and it is possible to reduce the cost because of no use connector and to improve the waterproof property because the connecting members 601 are buried in the coating 22 of the connection cable 2.

In each of the first and second embodiment, it is not necessarily but is preferable to provide the wire connection part 13 on the supporting body 12 because the solar cell module 1 comprising the wire connection part 13 on the supporting body 12 is easily carried and achieves an improvement in the work efficiency. Moreover, solar cell modules according to the present invention are not limited to those having the structures explained in the first and second embodiments if they comprise a connecting member that passes through the coating of the connection cable and is electrically connected to the core wire thereof. For example, it is needless to say that one comprising the connecting member on the main body instead of on the upper lid is included within the scope of the present invention.

(Third Embodiment)

Figure 12:
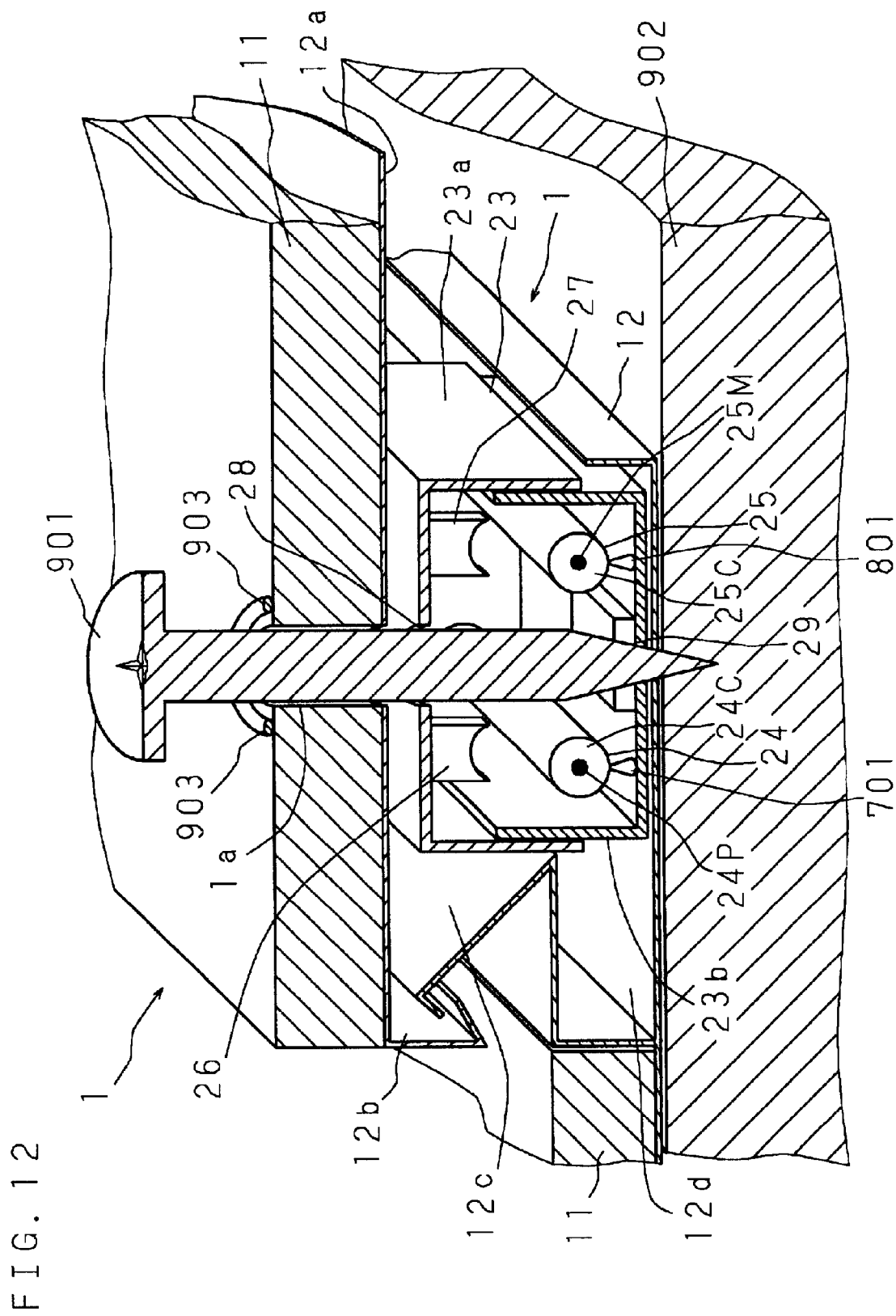
FIG. 12 is an illustration showing essential parts of adjacent solar cell modules arranged stepwise in an eave-ridge direction of a roof.

Next, referring to FIG. 12, the following description will explain the third embodiment of the present invention directed to a method of installing a plurality of solar cell modules 1.

FIG. 12 is an illustration showing essential parts of adjacent solar cell modules 1 arranged stepwise in an eave-ridge direction of a roof. Like the first and second embodiments, the solar cell module 1 is constructed by bonding the solar cell portion 11 comprising solar cells made of a photoelectric converting material, such as crystalline silicon or amorphous silicon, onto the supporting body 12 made of a steel plate, for example. This supporting body 12 has the flat plate portion 12a onto which the solar cell portion 11 is bonded, the descended portion 12b and the ascended portion 12c provided on the eave side and the ridge side, respectively, so that the descended portion 12b of a solar cell module 1 on the ridge side (upper side) engages with the ascended portion 12c of a solar cell module 1 on the eave side.

Moreover, the supporting body 12 has the extended portion 12d which is further extended from the ascended portion 12c toward the ridge, and the ridge-side end of this extended portion 12d is bent upward. The extended portion 12d is provided with a wire connection part 23 for electrically connecting the solar cell module 1 to the connection cables 24 and 25. A hole 1a is formed at an end of the solar cell module 1 opposite to the extended portion 12d so as to pierce the solar cell portion 11 and the supporting body 12 (flat plate portion 12a) located below, so that the solar cell module 1 is installed on a sheathing roof board 902 by fastening a screw 901 passing through this hole 1a. A waterproof sealing member 903 is provided on the periphery of this hole 1a of the solar cell module 1.

The wire connection part 23 is composed of an upper lid 23a having a substantially square bracket-shaped cross section and a lower lid 23b which is slightly smaller than the upper lid 23a and has a substantially square bracket-shaped cross section like the upper lid 23a, so that the lower lid 23b can be covered with the upper lid 23a. A positive connection cable 24 constructed by sealing a positive core wire 24P with a coating 24C and a negative connection cable 25 constructed by sealing a negative core wire 25M with a coating 25C are inserted in parallel into this wire connection part 23. Pin-like connecting members 701 and 801 are attached to the inner face of the lower lid 23b at positions corresponding to the core wires 24P and 25M of the respective one-conductor connection cables 24 and 25 in such a manner that they protrude toward the upper lid 23a. A positive connecting wire (not shown) drawn from the solar cell portion 11 of the solar cell module 1 on the eave side (lower side) is connected to this connecting member 701, and similarly a negative connecting wire (not shown) drawn from the solar cell portion 11 is connected to the connecting member 801.

Pressing members 26 and 27 for pressing the connection cables 24 and 25 during later-described screw fixation are formed on the inner face of the upper lid 23a at positions corresponding to the connection cables 24 and 25, respectively. Moreover, holes 28 and 29 through which the screw 901 is to pass are formed in the upper lid 23a and the lower lid 23b at a position corresponding to the center between the connection cables 24 and 25.

Next, the following description will explain a method of installing a plurality of solar cell modules 1 having a structure as mentioned above on the sheathing roof board 902.

The solar cell module 1 on the eave side is arranged on the sheathing roof board 902, and one line of each of the positive and negative connection cables 24 and 25 is arranged on the lower lid 23b of the wire connection part 23. Next, the upper lid 23a is placed over the lower lid 23b while making the positions of the holes 28 and 29 coincident with each other. At this time, the pressing members 26 and 27 slightly touch the connection cables 24 and 25, and the connecting members 701 and 801 also touch the peripheral faces of the connection cables 24 and 25 slightly but do not reach the core wires 24P and 25M.

The solar cell module 1 on the ridge side is arranged such that its eave-side portion (lower-side portion) is placed over the extended portion 12d of the solar cell module 1 on the eave side. At this time, the hole 1a of the solar cell module 1 on the ridge side and the holes 28 and 29 of the wire connection part 23 of the solar cell module 1 on the eave side are positioned to coincide with each other, and the descended portion 12b of the ridge-side solar cell module 1 is caused to engage with the ascended portion 12c of the eave-side solar cell module 1.

Thereafter, the screw 901 is inserted through the holes 1a, 28 and 29, and the inserted screw 901 is tightened so that its pointed end enters into the sheathing roof board 902 to fix the eave-side portion of the ridge-side solar cell module 1 and fix the eave-side solar cell module 1 to the sheathing roof board 902. In this case, the engagement of the ascended portion 12c of the eave-side solar cell module 1 and the descended portion 12b of the ridge-side solar cell module 1 is enhanced by the tightening of the screw 901, thereby ensuring a high waterproof property.

Moreover, the electrical connection between the eave-side solar cell module 1 and the connection cables 24 and 25 (core wires 24P and 25M) can be realized simultaneously by a function as described below. By tightening the screw 901, the upper lid 23a of the wire connection part 23 is pressed downward, and the pressing members 26 and 27 press the connection cables 24 and 25 downward. As a result, the connecting members 701 and 801 pass through the coatings 24C and 25C of the connection cables 24 and 25 and come into contact with the core wires 24P and 25M.

As described above, according to the third embodiment, it is possible to fix the solar cell modules 1, ensure a waterproof property between adjacent solar cell modules 1 in the eave-ridge direction and realize electrical connection of the solar cell module 1 with the connection cables 24 and 25 simultaneously, achieve an extremely high working efficiency, and significantly shorten the time taken for the installation of a plurality of solar cell modules 1.

Furthermore, the eave-side solar cell module 1 can be easily detached by loosening the screw 901, and it is therefore possible to readily replace the solar cell modules 1 on a piece by piece basis. Besides, at this time, since the electrical connection with the connection cables 24 and 25 is cut simultaneously, an excellent working efficiency is realized.

(Fourth Embodiment)

Figure 13:
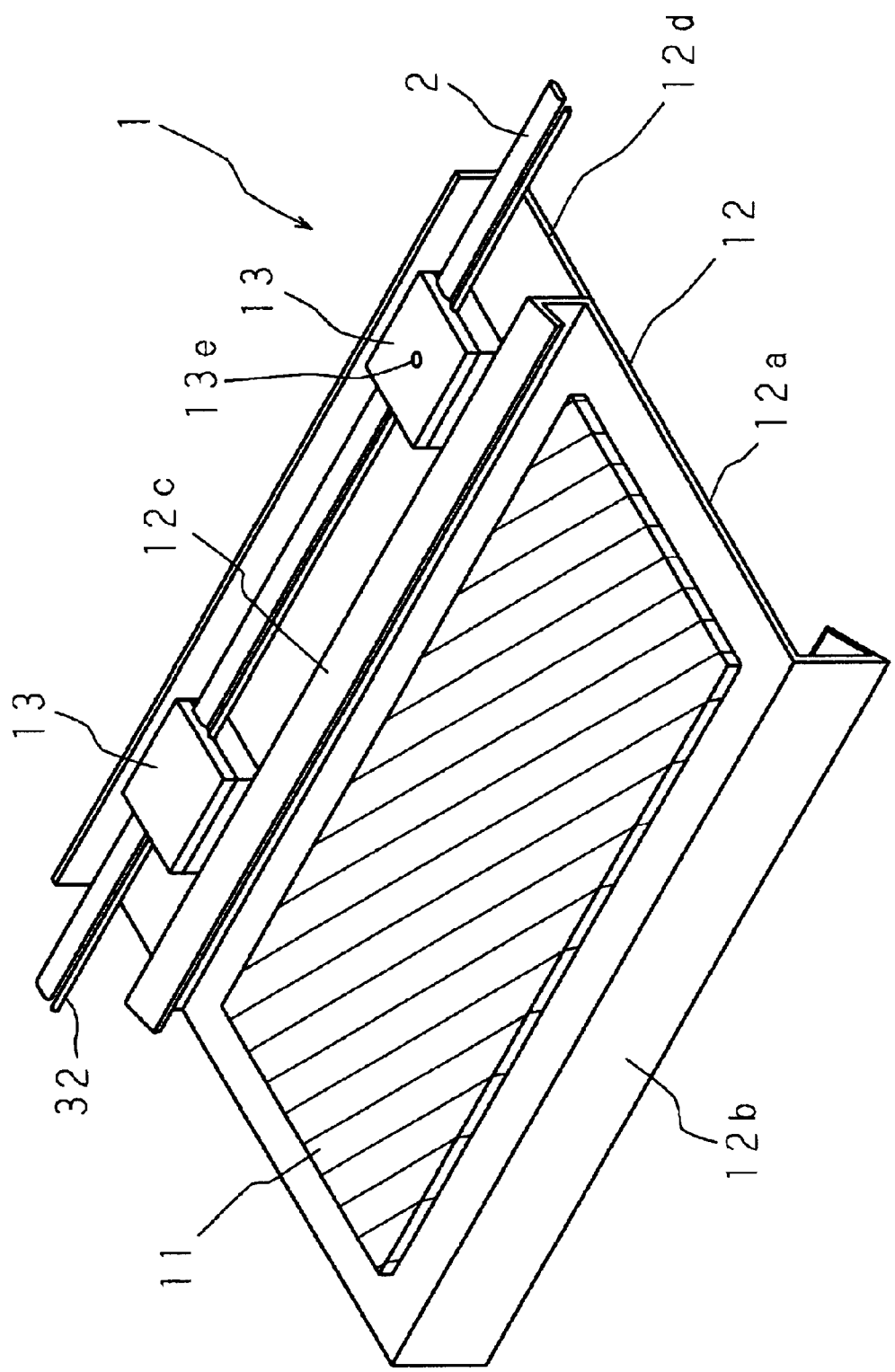
FIG. 13 is a perspective view of a solar cell module according to the fourth embodiment.

FIG. 13 is a perspective view showing the appearance of the solar cell module 1 according to the fourth embodiment.

In FIG. 13, the same portions as in FIG. 2 are designated with the same codes, and the explanation thereof will be omitted. In FIG. 13, numeral 32 is a ground wire arranged in parallel with the connection cable 2. In this fourth embodiment, like the first embodiment, a pair of positive and negative wire connection parts 13 for electrically connecting the solar cell module 1 to the connection cable 2 is arranged on the extended portion 12d, but either of the wire connection parts 13 also performs the function of a ground connection part for grounding the solar cell module 1, i.e., for connecting the solar cell module 1 to the ground wire 32.

Figure 14:
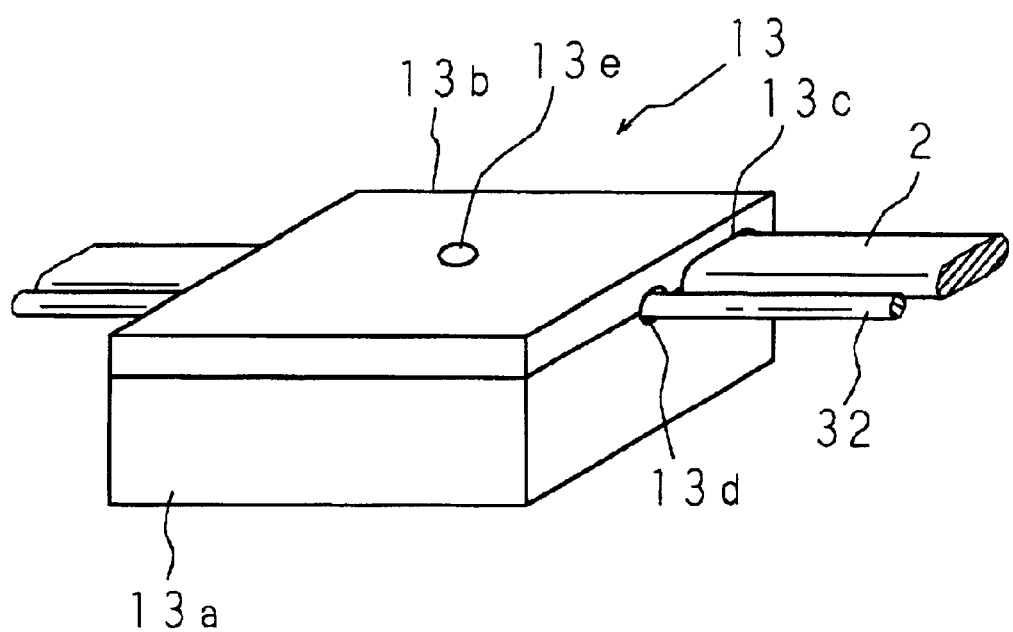
FIG. 14 is a perspective view of a wire connection part.

Next, referring to FIGS. 14 through 18, the following description will explain in detail the structure of the wire connection part 13 that performs both the functions of making a wire connection and a ground connection. Note that, in FIGS. 14 through 18, the same portions as in FIGS. 3 through 6 are designated with the same codes. FIG. 14 is a perspective view showing the appearance of this wire connection part 13, and also illustrates the connection cable 2 and the ground wire 32 for reference. As shown in FIG. 14, the wire connection part 13 has a substantially rectangular parallelepiped shape, and is composed of the main body 13a and the upper lid 13b, each of which is made of an insulating plastic resin. Opening portions 13c and 13d for allowing insertion of the connection cable 2 and the ground wire 32, respectively, are formed in the side faces. Moreover, a hole 13e for allowing insertion of a later-described screw is formed in the upper lid 13b.

Figure 15:
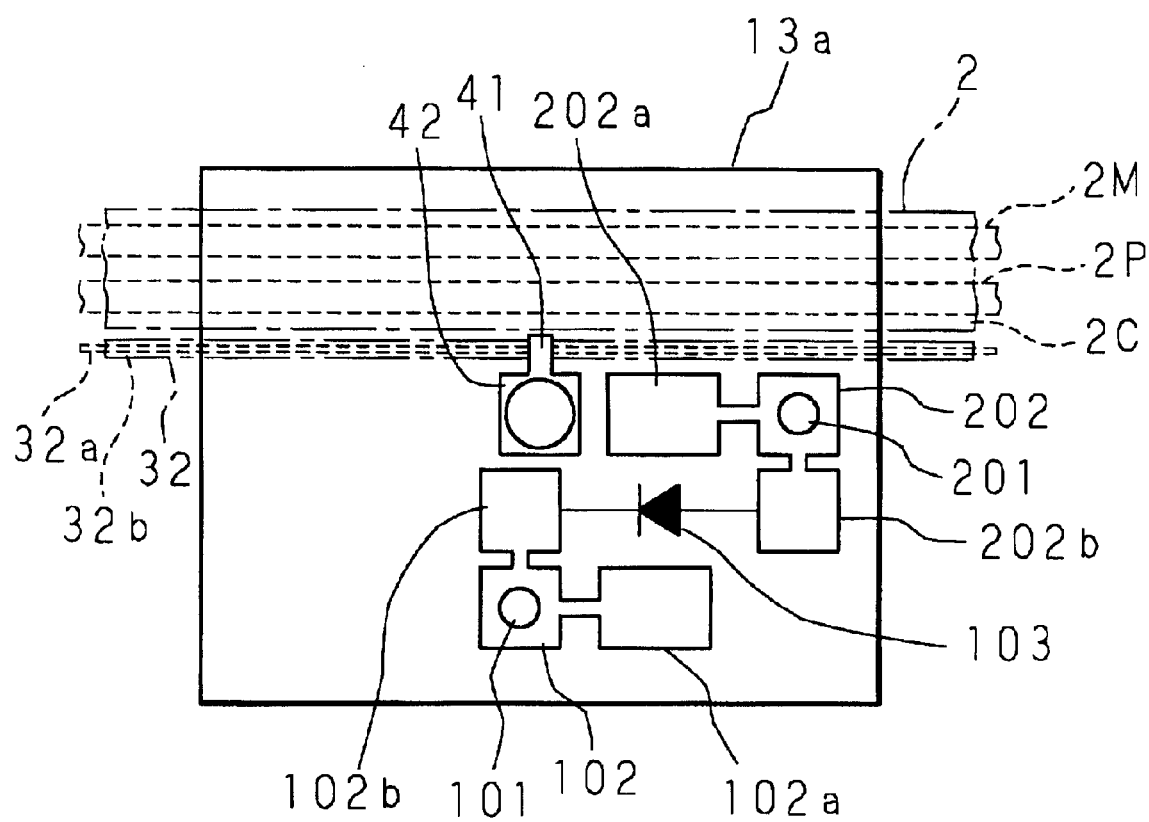
FIG. 15 is a plan view of the main body of the wire connection part.
Figure 16:
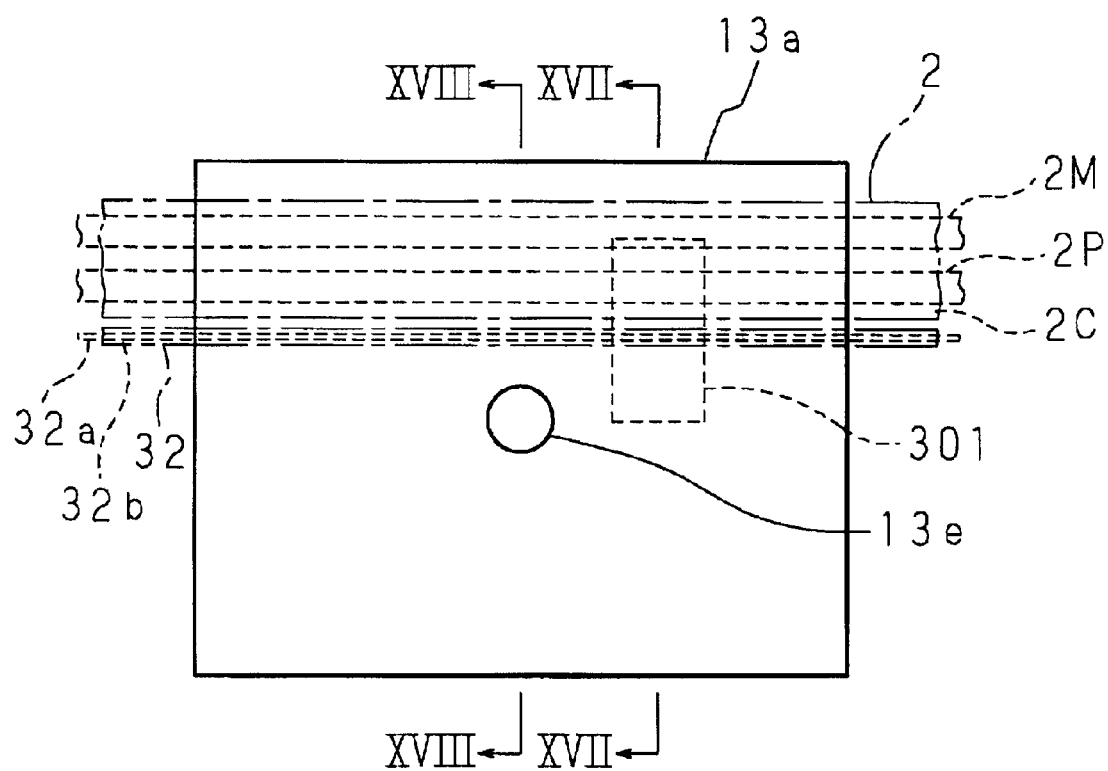
FIG. 16 is a plan view of the upper lid of the wire connection part.
Figure 17:
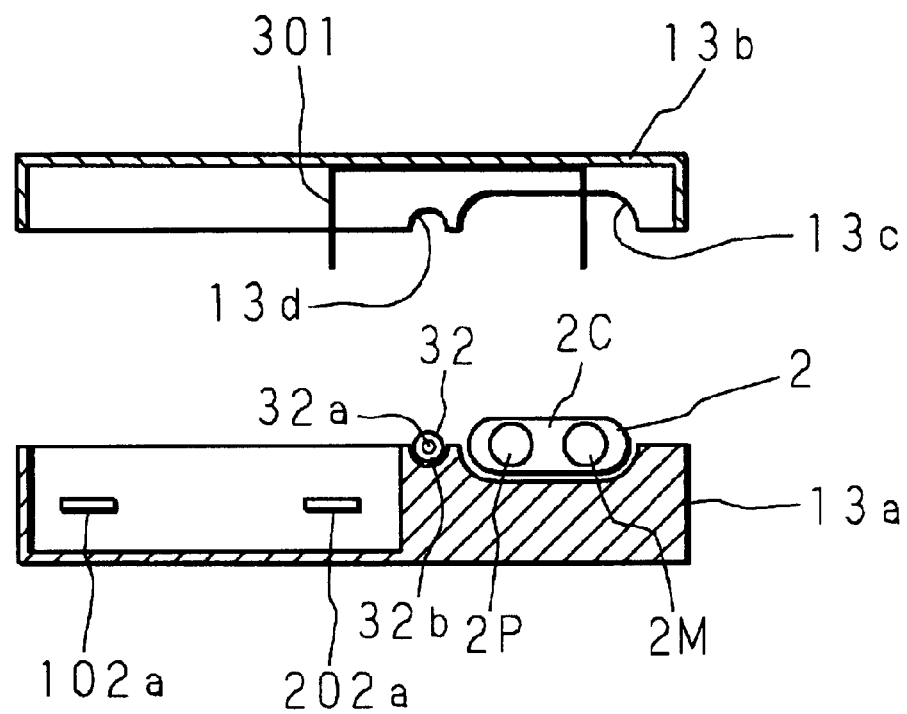
FIG. 17 is a cross section cut along the XVII—XVII line of FIG. 16.
Figure 18:
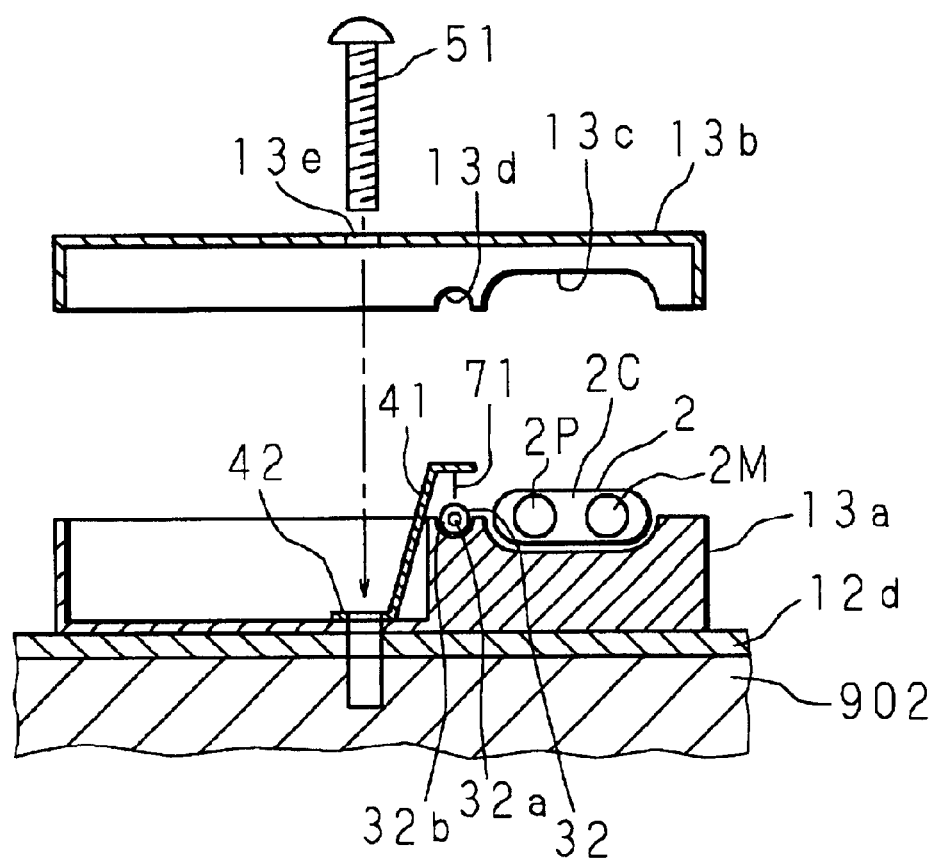
FIG. 18 is a cross section cut along the XVIII—XVIII line of FIG. 16.

FIG. 15 is a plan view of the main body 13a of the wire connection part 13 seen from an upper direction, and FIG. 16 is a plan view of the upper lid 13b of the wire connection part 13. Besides, FIG. 17 is a cross section cut along the XVII—XVII line of FIG. 16, and FIG. 18 is a cross section cut along the XVIII—XVIII line of FIG. 16. In FIGS. 15 and 16, the connection cable 2 using a two-conductor cable similar to that shown in FIGS. 4 and 5 and the ground wire 32 constructed by sealing a core wire 32a shown by the broken lines with a coating 32b are respectively indicated by the alternate long and short dash lines. In addition, FIG. 18 also shows a screw 51 used for fixation, the extended portion 12d of the supporting body 12, and the sheathing roof board 902 on which the solar cell module 1 is to be installed.

Numeral 41 is a ground connecting member made of a metal, and 42 is a screw-fixation portion connected to the ground connecting member 41. The ground connecting member 41 has a ground connection pin 71 extended to a position corresponding to the core wire 32a of the ground wire 32. By inserting the screw 51 into the hole 13e and the screw-fixation portion 42 and fastening the screw 51, the ground connecting member 41 and the extended portion 12d located thereunder are connected, and the extended portion 12d is fixed to the sheathing roof board 902 located thereunder.

Next, the following description will explain a method of connecting the solar cell module 1 to the connection cable 2 and to the ground wire 32 simultaneously by using the wire connection part 13 having a structure as mentioned above. Note that, since the procedure of connecting the solar cell module 1 to the connection cable 2 is the same as in the first embodiment, the detailed explanation thereof will be omitted.

First, the upper lid 13b of the wire connection part 13 is removed, and the connection cable 2 and the ground wire 32 are positioned in the opening portions 13c and 13d, respectively. Next, by closing the upper lid 13b, the ground connection pin 71 of the ground connecting member 41 is brought into contact with the ground wire 32, and its pointed end is further passed through the coating 32b of the ground wire 32, pressed against the core wire 32a and electrically connected to the core wire 32a.

Then, screw fixation is performed until the screw 51 passes through the extended portion 12d from the upper lid 13 through the hole 13e and the screw-fixation portion 42 and reaches the sheathing roof board 902. With this screw fixation, the ground connecting member 41 connected to the core wire 32a of the ground wire 32 and the extended portion 12d are connected, and the solar cell module 1 is electrically connected to the ground wire 32, thereby grounding the solar cell module 1. Moreover, the extended portion 12d is installed/fixed on the sheathing roof board 902, i.e., the solar cell module 1 is installed/fixed on the sheathing roof board 902, simultaneously with this screw fixation.

As described above, according to the fourth embodiment, since the ground connecting member 41 is passed through the coating 32b of the ground wire 32 and electrically connected to the core wire 32a by an action of closing the upper lid 13b of the wire connection part 13, the process of connecting the solar cell module 1 to the ground wire 32 is extremely easy. Moreover, the connection of the ground wire 32 and solar cell module 1 (extended portion 12d) and the fixation of the solar cell module 1 to the sheathing roof board 902 are performed simultaneously by a single screw-fixation action, the working efficiency is extremely high.

While the above-described example illustrates a case where the solar cell module 1 is grounded according to the first embodiment (an example in which a plurality of solar cell modules 1 are connected to the connection cable 2 in parallel), it is of course possible to similarly realize a structure where a cable connection and a ground connection are made using a common wire connection part 13 according to the second embodiment (an example in which a plurality of solar cell modules 1 are connected to the connection cable 2 in series).

(Fifth Embodiment)

In the above-described example of the ground connection according to the fourth embodiment, while the wire connection part 13 used for the cable connection is also used for the ground connection, it is needless to say that the ground connection may be made by independently providing a ground connection part different from the wire connection part 13 used for the cable connection.

An example of such a ground connection will be explained below. FIG. 19A is a front view showing one example of the ground connection part, and FIG. 19B is a cross section cut along the b—b line of FIG. 19A. FIG. 19B also shows the extended portion 12d where no solar cell portion is mounted and the sheathing roof board 902 on which the solar cell module 1 is installed/fixed.

A ground connection part 61 comprises an upper lid 61a, a lower lid 61b and a screw-fixation section 62, and the ground wire 32 constructed by sealing the core wire 32a with the coating 32b passes through a void between these upper lid 61a and lower lid 61b. The ground connection pin 71 protrudes from the upper lid 61a at a position corresponding to the core wire 32a of the ground wire 32.

Next, the following description will explain a method of making a ground connection of the solar cell module 1 with the ground wire 32 by using the ground connection part 61 having a structure as mentioned above. First, the screw 51 is passed through the screw-fixation section 62 and the extended portion 12b until it reaches the sheathing roof board 902, and the ground connection part 61 is attached to the extended portion 12d with its upper lid 61a being open as shown in FIG. 19B. As a result, the extended portion 12d and the screw-fixation section 62 are electrically connected. Moreover, since the extended portion 12d is fixed to the sheathing roof board 902 by this screw fixation, the solar cell module 1 can be installed/fixed on the sheathing roof board 902 simultaneously.

Next, the ground wire 32 is arranged to pass through the ground connection part 61, and the upper lid 61a is closed as shown by the broken line of FIG. 19B, so that the ground connection pin 71 passes through the coating 32b of the ground wire 32 and is electrically connected to the core wire 32a. As a result, the extended portion 12d is electrically connected to the ground wire 32, thereby grounding the solar cell module 1.

Also, in this example, since the ground connection pin 71 is passed through the coating 32b of the ground wire 32 and electrically connected to the core wire 32a by the action of closing the upper lid 61a of the ground connection part 61, the process of connecting the solar cell module 1 to the ground wire 32 is extremely easy, and the cost can be reduced. Moreover, the connection of the ground wire 32 and the solar cell module 1 (extended portion 12d) and the fixation of the solar cell module 1 to the sheathing roof board 902 are achieved simultaneously by a single screw-fixation action, the working efficiency is extremely high.

Note that, while the above example illustrates a case where the ground connection part 61 is fixed to the extended portion 12d by a screw fixation, it is also possible to omit the screw fixation by electrically connecting the ground connection part 61 to the extended portion 12d using other technique such as welding.

As described in detailed above, since a solar cell module of the present invention comprises a connecting member to be passed through the coating of the cable and electrically connected to the core wire, it can be connected to the cable extremely easily. Moreover, unlike conventional examples, since no connector is used, it is possible to reduce the cost. Furthermore, since the connecting member is buried in the coating of the cable, it is possible to improve the waterproof property.

Besides, according to a method of connecting solar cell modules of the present invention, the solar cell modules can be very easily connected to the cable in parallel or in series, and the work efficiency for wiring can be improved.

In addition, according to a method of installing solar cell modules of the present invention, since each overlapped portion of the lower portion of a solar cell module on the upper side and the upper portion of a solar cell module on the lower side are fixed to an installing body with a screw, the lower-side solar cell module can be easily detached by loosening the screw, thereby enabling easy replacement of the solar cell modules on a piece by piece basis. Moreover, since the waterproofing process and the electrical connection process can be achieved simultaneously with the fixation process, it is possible to significantly shorten the working time for installing a plurality of solar cell modules.

Furthermore, since a solar cell module of the present invention comprises a ground connecting member which is passed through the coating of the ground wire and electrically connected to the core wire, it can be connected to the ground wire extremely easily.

Besides, according to a method of grounding solar cell module of the present invention, since the solar cell module (supporting body) and the ground wire are electrically connected by pressing the ground connecting member of the solar cell module to pass through the coating of the ground wire and come into contact with the core wire, it is possible to easily ground each solar cell module at a low cost.

Furthermore, according to a method of installing solar cell module of the present invention, since an electrical connection of the supporting body of the solar cell module with the ground connecting member and the fixation of the solar cell module to the installing body are achieved simultaneously by a single screw-fixation action, it is possible to improve the working efficiency.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A solar cell module including a supporting surface on a supporting body, the solar cell module to be connected to a cable constructed by sealing a core wire with a coating, comprising:

a solar cell portion provided on the supporting surface;

a waterproof enclosure on said supporting surface, said enclosure having openings positioned to allow the cable to pass continuously straight through said enclosure and consisting essentially of a main body and a lid; and a connecting member within said enclosure, constructed to be passed through the coating of said cable and electrically connected to the core wire of said cable in response to the placement of the lid on the main body.

2. The solar cell module of claim 1, wherein said supporting body supports said solar cell portion and said connecting member.

3. The solar cell module of claim 1, wherein
said connecting member is a pair of positive and negative connecting members to be electrically connected to a pair of positive and negative core wires of said cable.

4. A method of connecting a solar cell module to a cable, comprising the steps of:

preparing a solar cell module of claim 1; and connecting the prepared solar cell module to said cable by placing the lid on the main body, causing the connecting member of the prepared solar cell module to pass through the coating of said cable and come into contact with the core wire of said cable.

5. A solar cell module including a supporting surface on a supporting body, the solar cell module to be connected to a cable constructed by sealing a core wire with a coating, comprising:

a solar cell portion provided on the supporting surface;

a waterproof enclosure on the supporting surface, said enclosure having openings positioned to allow the cable to pass straight through said enclosure and consisting essentially of a main body and a lid; and a pair of positive and negative connecting members, within said enclosure constructed to be passed through the coating of said cable and electrically connected to the core wire of said cable in response to the placement of the lid on the main body; and a cutting member, within said enclosure, for cutting the core wire of said cable connected to said pair of positive and negative connecting members between said pair of positive and negative connecting members.

6. The solar cell module of claim 5, wherein said supporting body supports said solar cell portion and said pair of positive and negative connecting members.

7. A method of connecting a solar cell module to a cable, comprising the steps of:

preparing a solar cell module of claim 5, and connecting the prepared solar cell module to said cable by placing the lid on the main body, causing the pair of positive and negative connecting members of the prepared solar cell module to pass through the coating of said cable and come into contact with the core wire of said cable.

8. A method of installing a plurality of solar cell modules to overlap each other on an installing body, at least one solar cell module receiving a cable and having a connecting member constructed to pass into the cable, comprising the steps of:

arranging the solar cell modules so that a lower portion of a solar cell module on an upper side and an upper portion of said one solar cell module, which is on a lower side, overlap each other; and fixing each overlapped portion to said installing body by a screw fixation;

wherein an electrical connection of the one solar cell module on the lower side with the cable is made by the screw fixation causing the connecting member to pass into the cable.

9. A solar cell module including a supporting surface on a supporting body, the solar cell module to be connected to a ground wire constructed by sealing a core wire with a coating, comprising:

a solar cell portion provided on the supporting surface;

a waterproof enclosure on said supporting surface, said enclosure having openings positioned to allow the ground wire to pass continuously straight through said enclosure and consisting essentially of a main body and a lid; and a ground connecting member in said enclosure and positioned to be passed through the coating of said ground wire and electrically connected to the core wire of said ground wire in response to the placement of the lid on the main body.

10. The solar cell module of claim 9, wherein said supporting body is made of metal, for supporting said solar cell portion and said ground connecting member.

11. A method of connecting a solar cell module to a ground wire, comprising the steps of:

preparing a solar cell module of claim 9; and connecting the prepared solar cell module to said ground wire by placing the lid on the main body, causing the ground connecting member of the prepared solar cell module to pass through the coating of said ground wire and come into contact with the core wire of said ground wire.

12. A method of installing a solar cell module on an installing body, comprising the steps of:

preparing a solar cell module to be connected to a ground wire constructed by sealing a core wire with a coating, said solar cell module comprising a solar cell portion, a waterproof enclosure having openings positioned to allow the ground wire to pass continuously straight through said enclosure, and a ground connecting member in said enclosure and positioned to be passed through the coating of said ground wire and electrically connected to the core wire of said ground wire, said module further comprising a supporting body, made of a metal, for supporting said solar cell portion and said ground connecting member; and performing simultaneously a connection of said ground connecting member to said supporting body and an installation of the prepared solar cell module on said installing body by a screw fixation.

* * * * *